(12) United States Patent
Taherzadeh Boroujeni et al.

(10) Patent No.: US 11,575,488 B2
(45) Date of Patent: Feb. 7, 2023

(54) COVERAGE ENHANCEMENT FOR A BEAM CHANGE ACKNOWLEDGEMENT

(71) Applicant: QUALCOMM Incorporated, San Diego, CA (US)

(72) Inventors: Mahmoud Taherzadeh Boroujeni, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/116,965

(22) Filed: Dec. 9, 2020

(65) Prior Publication Data

US 2021/0184814 A1    Jun. 17, 2021

Related U.S. Application Data

(60) Provisional application No. 62/948,182, filed on Dec. 13, 2019.

(51) Int. Cl.
*H04L 5/00* (2006.01)
*H04W 72/04* (2009.01)

(52) U.S. Cl.
CPC ......... *H04L 5/0055* (2013.01); *H04W 72/046* (2013.01); *H04W 72/0413* (2013.01)

(58) Field of Classification Search
None
See application file for complete search history.

(56) References Cited

U.S. PATENT DOCUMENTS

| 2012/0093097 A1* | 4/2012 | Che | H04L 5/001 370/329 |
| 2017/0359826 A1* | 12/2017 | Islam | H04W 72/14 |
| 2018/0132264 A1* | 5/2018 | Jung | H04L 1/1864 |

(Continued)

FOREIGN PATENT DOCUMENTS

WO    2017/082810 A1    5/2017

OTHER PUBLICATIONS

International Search Report & Written Opinion dated Mar. 29, 2021 from corresponding PCT Application No. PCT/US2020/064281.

(Continued)

*Primary Examiner* — Hassan A Phillips
*Assistant Examiner* — Gautam Sharma
(74) *Attorney, Agent, or Firm* — Arent Fox, LLP

(57) ABSTRACT

Certain aspects of the present disclosure provide techniques for enhancing coverage while transmitting an acknowledgment (ACK) to a base station to acknowledge a beam change instruction. Such aspects of the present disclosure may increase the reliability of control information transmitted on a control channel by a user equipment (UE), such as ACK feedback transmitted on a physical uplink control channel by a UE to a base station. In certain aspects, a UE may receive, from a base station, information indicating a beam switch from a first beam via which the UE communicates with the base station to a second beam. The UE may further transmit, based on the information indicating the beam switch, two or more ACK messages to the base station on a control channel, and the two or more ACK messages may acknowledge receipt of the information indicating the beam switch from the base station.

30 Claims, 12 Drawing Sheets

(56) References Cited

U.S. PATENT DOCUMENTS

| | | | |
|---|---|---|---|
| 2018/0294937 A1* | 10/2018 | Nagaraja | H04L 5/0048 |
| 2020/0177266 A1* | 6/2020 | Kang | H04W 74/0833 |
| 2020/0205013 A1 | 6/2020 | John Wilson et al. | |
| 2021/0281296 A1* | 9/2021 | Koskela | H04B 7/063 |

OTHER PUBLICATIONS

Qualcomm I Ncorporated: Beam management 3GPP Draft; R2-1703564 Beam-Management, 3rd Generation Partnership Project (3GPP), Mobile Competence Centre . 650, Route Des Lucioles . F-06921 Sophia-Antipolis Cedex . France ; vol. RAN WG2, No. Spokane, USA; Apr. 3, 2017-Apr. 7, 2017 Apr. 3, 2017 (Apr. 3, 2017), XP051245403, Retrieved from the Internet: URL:http://www.3gpp.org/ftp/Meetings_3GPP_SYNC/RAN2/Docs/ [retrieved on Apr. 3, 2017] paragraph [2.IBeamswitchprocedure]; figures 2-3.

Research in Motion Ltd et al: HARQ RTT Timer and N/A Repetition in DRX; 3GPP Draft; R2-090569, 3rd Generation Partnership Project (3GPP), Mobile Competence Centre; 650, Route Des Lucioles; F-06921 Sophia-Antipolis Cedex ; France, No. Ljubljana; Jan. 16, 2009, Jan. 16, 2009 (Jan. 16, 2009), XP050322478, [retrieved on Jan. 16, 2009] p. 1.

Qualcomm Incorporated: Potential coverage enhancement techniques for PUCCH; 3GPP Draft; RI-2009802, 3rd Generation Partnership Project (3GPP), Mobile Competence Centre; 650, Route Des Lucioles; F-06921 Sophia-Antipolis Cedex ; France, vol. RAN WGI, No. e-Meeting; Oct. 26, 2020-Nov. 13, 2020 Nov. 17, 2020 (Nov. 17, 2020), XP051955627, Retrieved from the Internet. Item 4 Continued: URL:https://ftp.3gpp.org/tsg ran/WGI_RLI/TSGRI_103-e/Docs/RI-2009802.zip -RI-2009802/RI-2009802 Potential coverage enhancement techniques for PUCCH.docx [retrieved on Nov. 17, 2020] paragraph [3. Enhancing beam switching reliability].

* cited by examiner

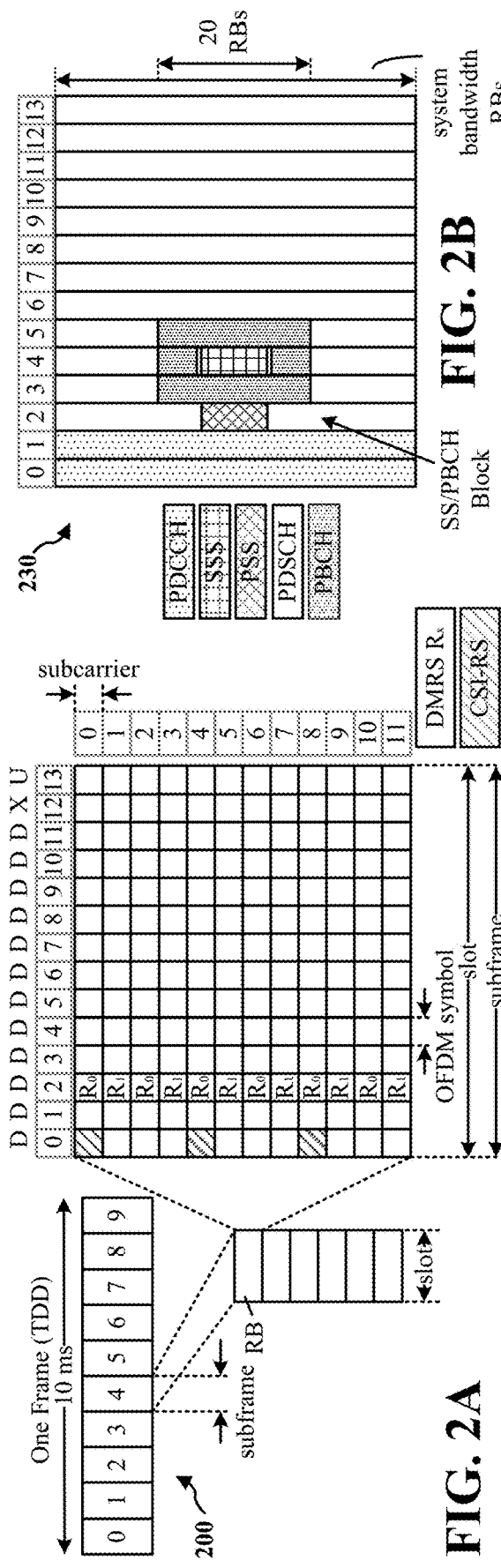
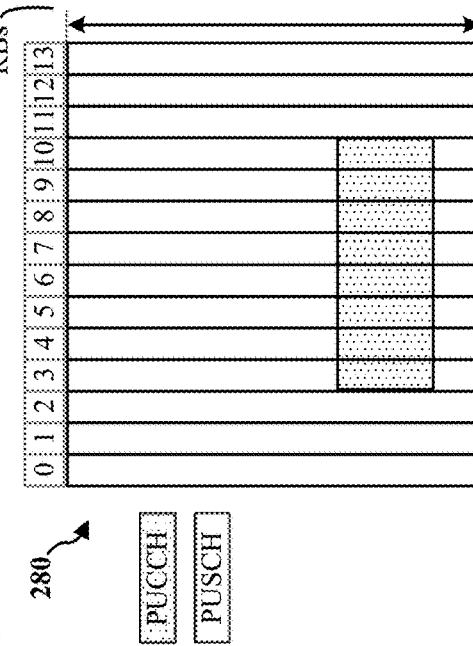
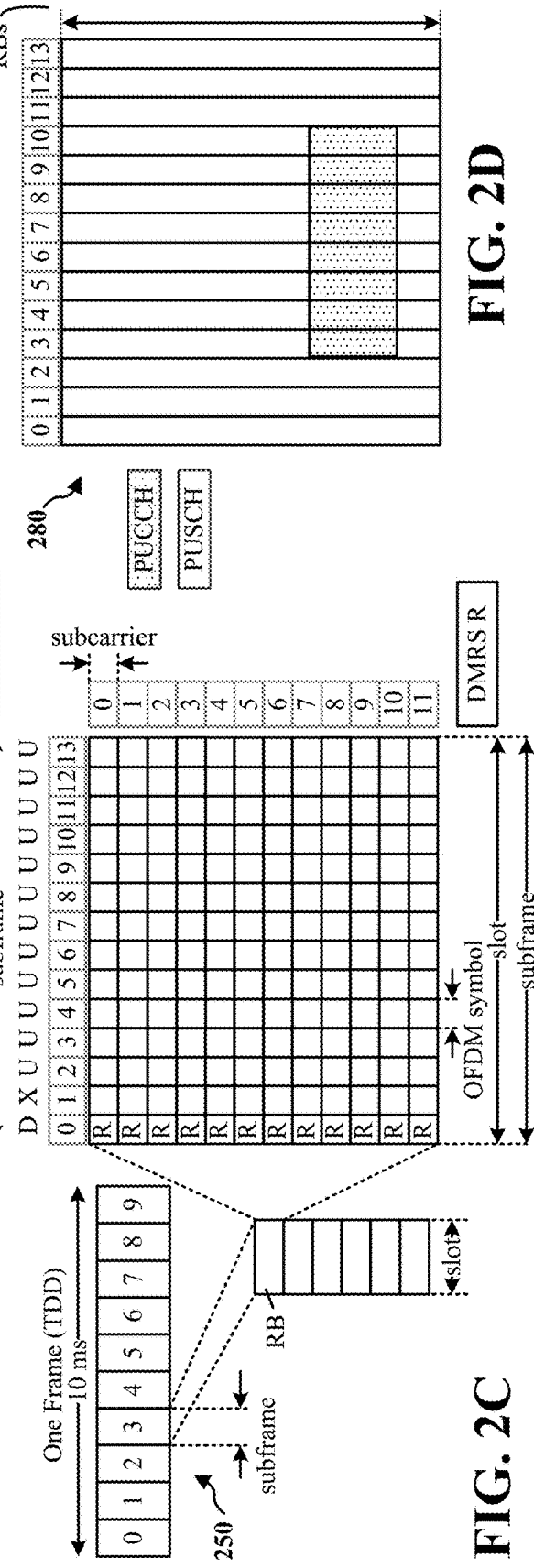
FIG. 2A  FIG. 2B  FIG. 2C  FIG. 2D

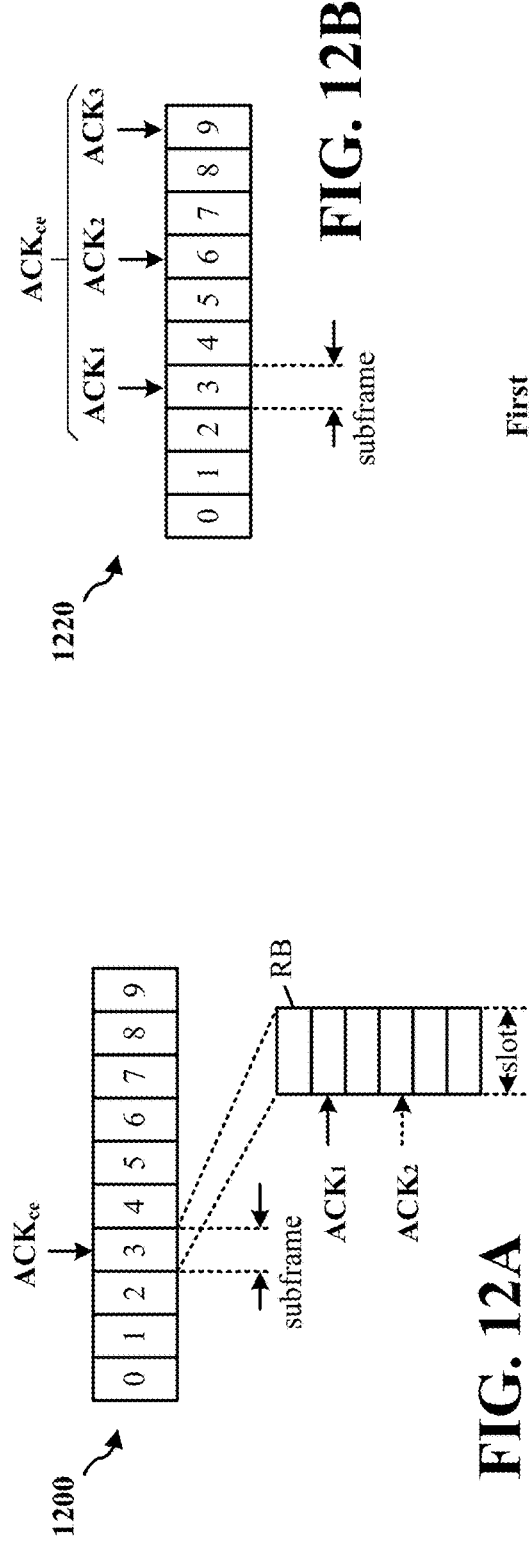
FIG. 12A
FIG. 12B
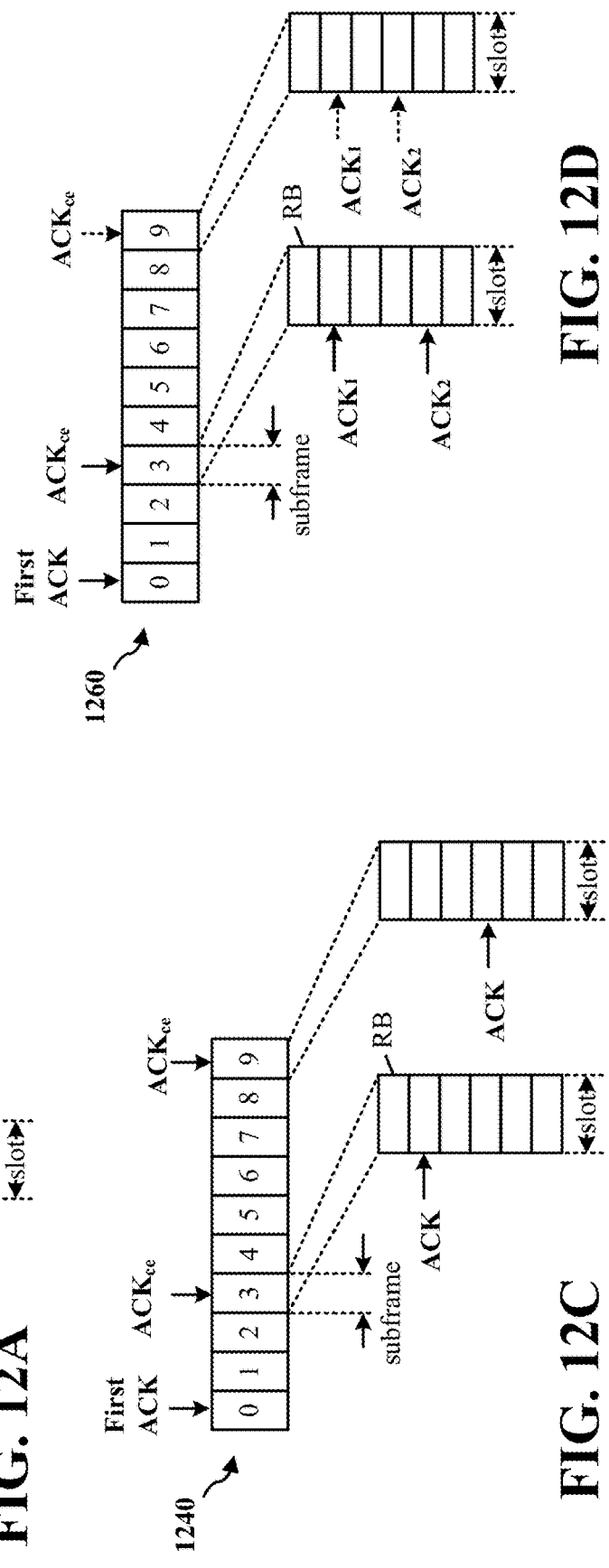
FIG. 12C
FIG. 12D

COVERAGE ENHANCEMENT FOR A BEAM CHANGE ACKNOWLEDGEMENT

CROSS-REFERENCE TO RELATED APPLICATION(S)

This application claims the benefit of U.S. Provisional Application Ser. No. 62/948,182, entitled "COVERAGE ENHANCEMENT FOR A BEAM CHANGE ACKNOWLEDGEMENT" and filed on Dec. 13, 2019, which is expressly incorporated by reference herein in its entirety.

BACKGROUND

Technical Field

The present disclosure relates generally to communication systems, and more particularly, to a beam change in wireless communication between a user equipment (UE) and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some radio access networks (RANs), base stations and user equipments (UEs) may communicate in a millimeter wave (mmW) spectrum (e.g., in some aspects, the mmW spectrum may include some near-mmW spectrum). Accordingly, base stations and UEs may beamform transmissions, which may mitigate higher path loss at higher frequencies, e.g., relative to omnidirectional transmission and/or transmission in sub-six and/or sub-seven gigahertz (GHz) frequency bands.

With a beamforming technique, a base station may select one of a set of beams pointing to different directions to communicate the selected beam. After selection of the beam, an optimal beam may change, and thus the base station may determine to change from a current beam to another beam. In a process of a beam change, the base station may transmit a beam change instruction to a user equipment (UE) to indicate that the base station intends to change from a current beam to another beam. The base station may ensure that the UE has properly received the beam change instruction, and may switch beams after receipt of acknowledgment (ACK) feedback from the UE acknowledging receipt of the beam change instruction. The UE may receive the beam change instruction from the base station and transmit the acknowledgement to the base station.

Potentially, the base station may fail to successfully receive some transmissions from the UE, e.g., due to the higher path loss in mmW communication and/or other factors affecting the channel on which the UE beamforms such transmissions. For example, the base station may fail to receive ACK feedback from the UE when the signal path becomes blocked (e.g., a beam via which the UE transmits the ACK feedback may become blocked), the transmission power is insufficient, and/or another reason(s).

The UE may transmit some control information, such as ACK feedback, to the base station on an uplink control channel, such as a physical uplink control channel (PUCCH). When the base station is unable to receive UE transmissions on the uplink control channel, e.g., due to the beam via which the UE transmits on the control channel becoming blocked, insufficient transmission power configured for uplink control channel transmissions, etc., the base station may fail to receive ACK feedback from the UE confirming UE reception of a beam change instruction.

Failure of the base station to successfully receive ACK feedback from the UE in response to a beam change instruction may result in beams becoming unaligned, loss of timing synchronization, radio link failure, and/or other potential undesirable results. Thus, a need exists to address unsuccessful transmissions on control channels beamformed by UEs.

The present disclosure describes various techniques and solutions to increasing the reliability of transmissions by UEs on control channels, such as the PUCCH. In particular, the present disclosure describes some systems, methods, and apparatuses for enhancing coverage of transmissions on control channels, including ACK feedback and other control information on a PUCCH.

In an aspect of the disclosure, a method, a computer-readable medium, and an apparatus are provided. The apparatus may be a UE or a component thereof. The apparatus may receive, from a base station, information indicating a beam switch from a first beam via which the apparatus communicates with the base station to a second beam. The apparatus may further transmit, based on the information indicating the beam switch, two or more ACK messages to the base station on a control channel. The two or more ACK messages may acknowledge receipt of the information indicating the beam switch from the base station.

In an aspect of the disclosure, a method, a computer-readable medium, and an apparatus are provided. The apparatus may be a base station or a component thereof. The apparatus may transmit, to a UE, information indicating a beam switch from a first beam via which the apparatus communicates with the UE to a second beam. The apparatus may further receive, in response to the transmitted information indicating the beam switch, two or more ACK messages to the base station on a control channel from the UE. The two or more ACK messages may acknowledge receipt of the information indicating the beam switch from the apparatus.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 12A, 12B, 12C, and 12D are diagrams illustrating examples of coverage enhancements used by the UE to transmit an ACK.

DETAILED DESCRIPTION

Figure 1:
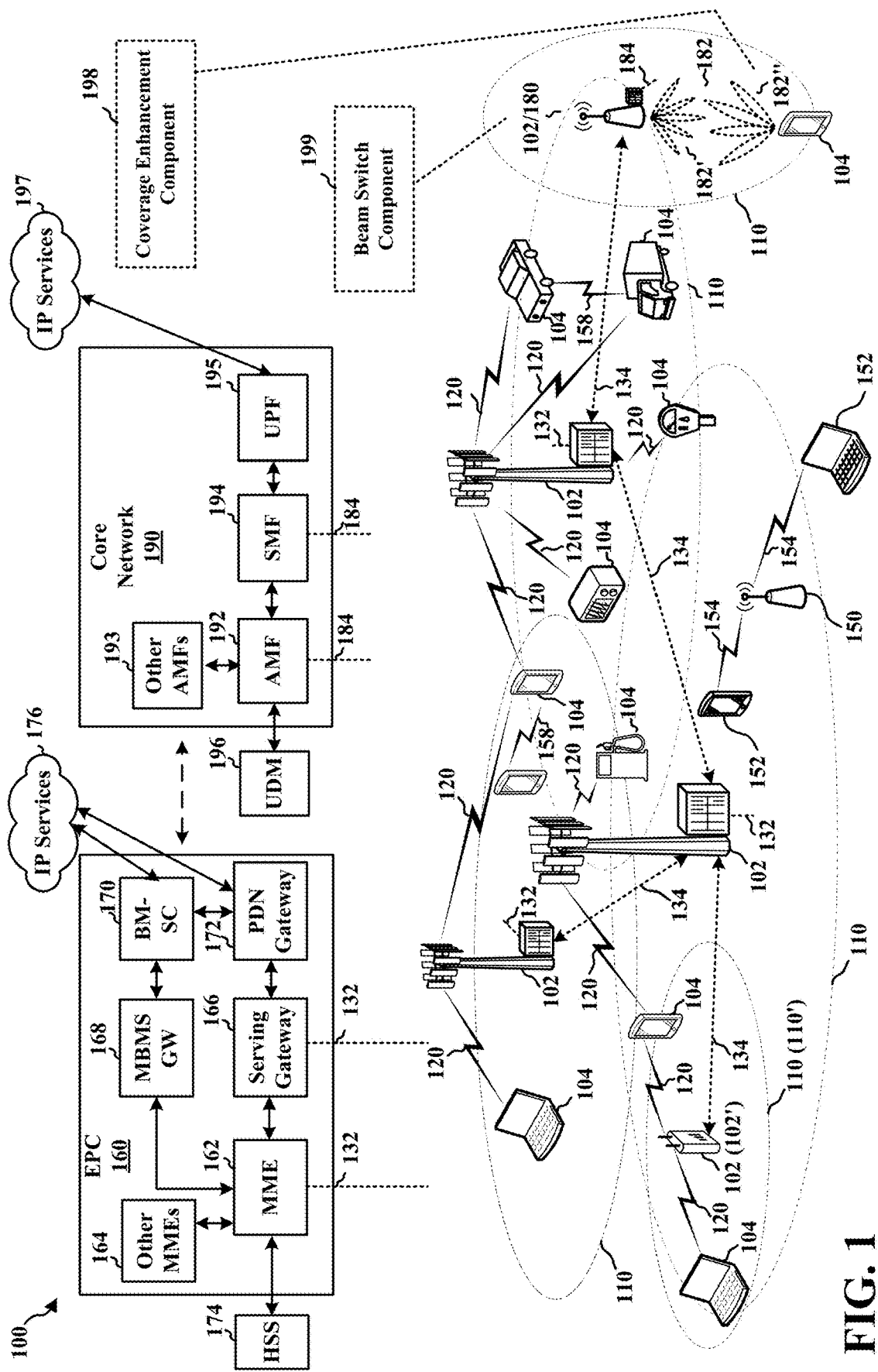
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., 51 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to utilize a coverage enhancement to transmit an ACK to a base station to acknowledge a beam change instruction. For example, the UE 104 of FIG. 1 may include a coverage enhancement component 198 configured to determine to transmit an acknowledgement (ACK) on a physical uplink control channel (PUCCH) with a coverage enhancement to acknowledge the transmit beam change by the base station. The UE 104 may receive, from a base station (e.g., 102/180), a downlink signal. The UE 104 may determine that the downlink signal includes a beam switch signal indicating that the base station will change a transmit beam for downlink communication with the UE 104. The UE may determine, based on the determination that the DL signal includes the beam switch signal, to transmit an ACK in a PUCCH with a coverage enhancement to acknowledge the transmit beam change by the base station. The UE 104 may transmit, to the base station, the ACK in the PUCCH with the coverage enhancement.

Referring again to FIG. 1, in certain aspects, the base station 102/180 may be configured to receive an ACK from a UE acknowledging reception of a beam switch signal, where the ACK is received with a coverage enhancement. For example, the base station 102/180 of FIG. 1 may include a beam switch component 199 configured to generate a downlink signal including a beam switch signal indicating that the base station 102/180 will change its downlink transmit beam. The base station 102/180 may transmit, to a UE, a downlink signal including a beam switch signal indicating that the base station will change a transmit beam for downlink communication with the UE 104. The base station 102/180 may receive an ACK from the UE acknowledging the reception of the transmit beam change by the base station.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^µ$ slots/subframe. The subcarrier spacing and symbol length/duration are a function of the numerology. The subcarrier spacing may be equal to $2^µ*15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
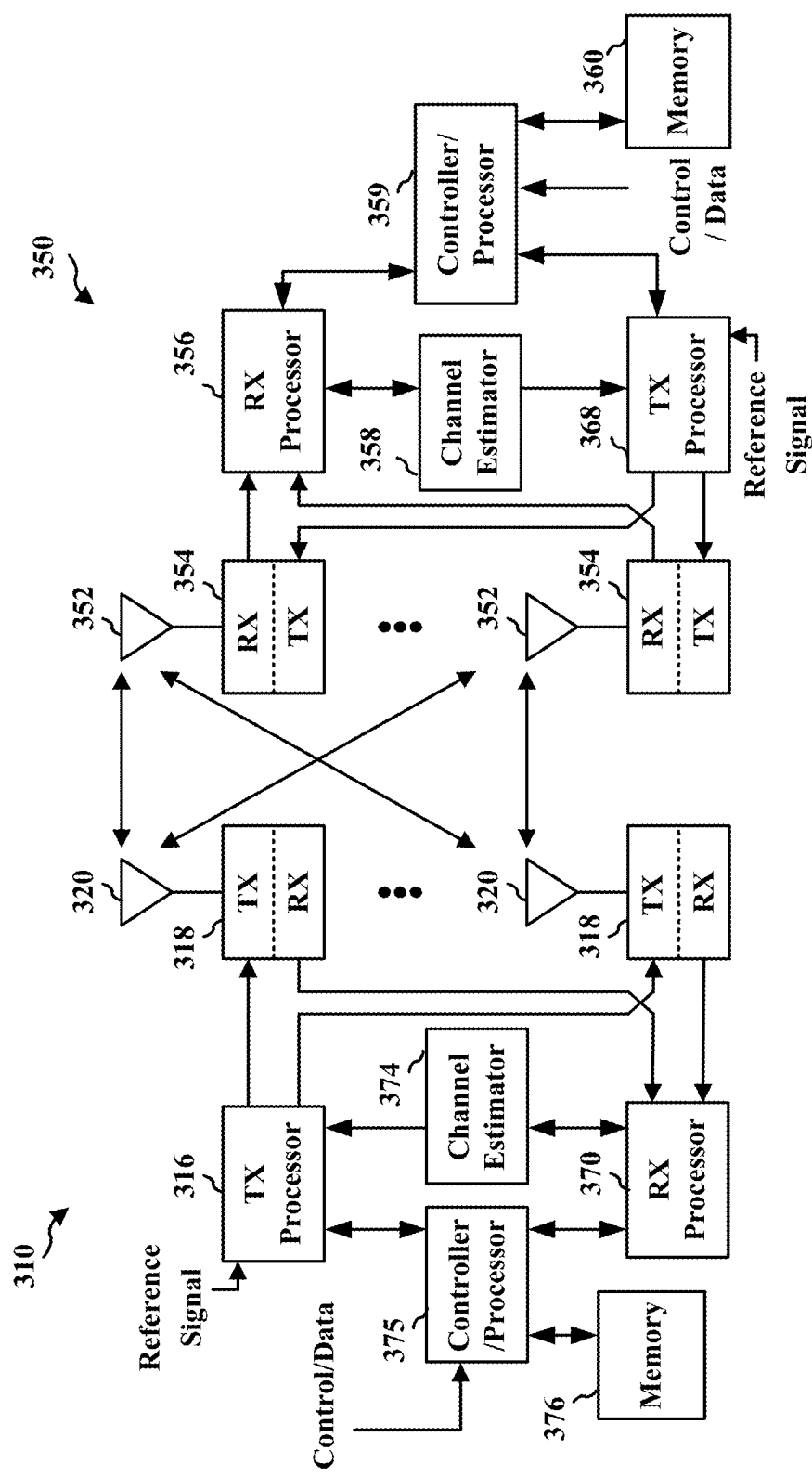
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing.

The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communication systems, such as but not limited to mmW systems, a base station may perform transmissions in a directional manner, where the transmissions are beamformed to steer the transmissions of the beams in different directions. Beamforming may mitigate high path loss at higher frequencies. In mmW systems the carrier frequency is high, which results in a shorter wavelength, which allows for a higher number of antennas to be utilized within an antenna array, at either the UE or the base station. Due to the increase number of antennas, beamforming may be utilized to alter the direction of the beam by applying different phases to the different antennas.

One challenge in using beamforming for a mmW system may be due to the directional nature of the beamformed beams. Due to the directional nature of the beamformed beam, the base station should point the beam directly at the UE such that the direction of the beam aligns with the location of the UE to provide more antenna receive gain at the UE. If the direction of the beam is not properly aligned, the antenna gain at the UE may be decreased (e.g., resulting in low SNR, higher block error rates, etc.).

With a beamforming technique, a base station may select one of a set of beams pointing to different directions to communicate the selected beam. After selection of the beam, an optimal beam may change, and thus the base station may determine to change from a current beam to another beam. In a process of a beam change, the base station may transmit a beam change instruction to a UE to indicate that the base station intends to change from a current beam to another beam. The base station needs to ensure that the UE has properly received the beam change instruction, and may require the base station to switch beams only after receipt of an acknowledgment from the UE acknowledging receipt of the beam change instruction. The UE may receive the beam change instruction from the base station and transmit the acknowledgement to the base station. However, the uplink signal from the UE to the base station may experience problems, such that the base station may not successfully receive the acknowledgement from the UE.

Figure 4:
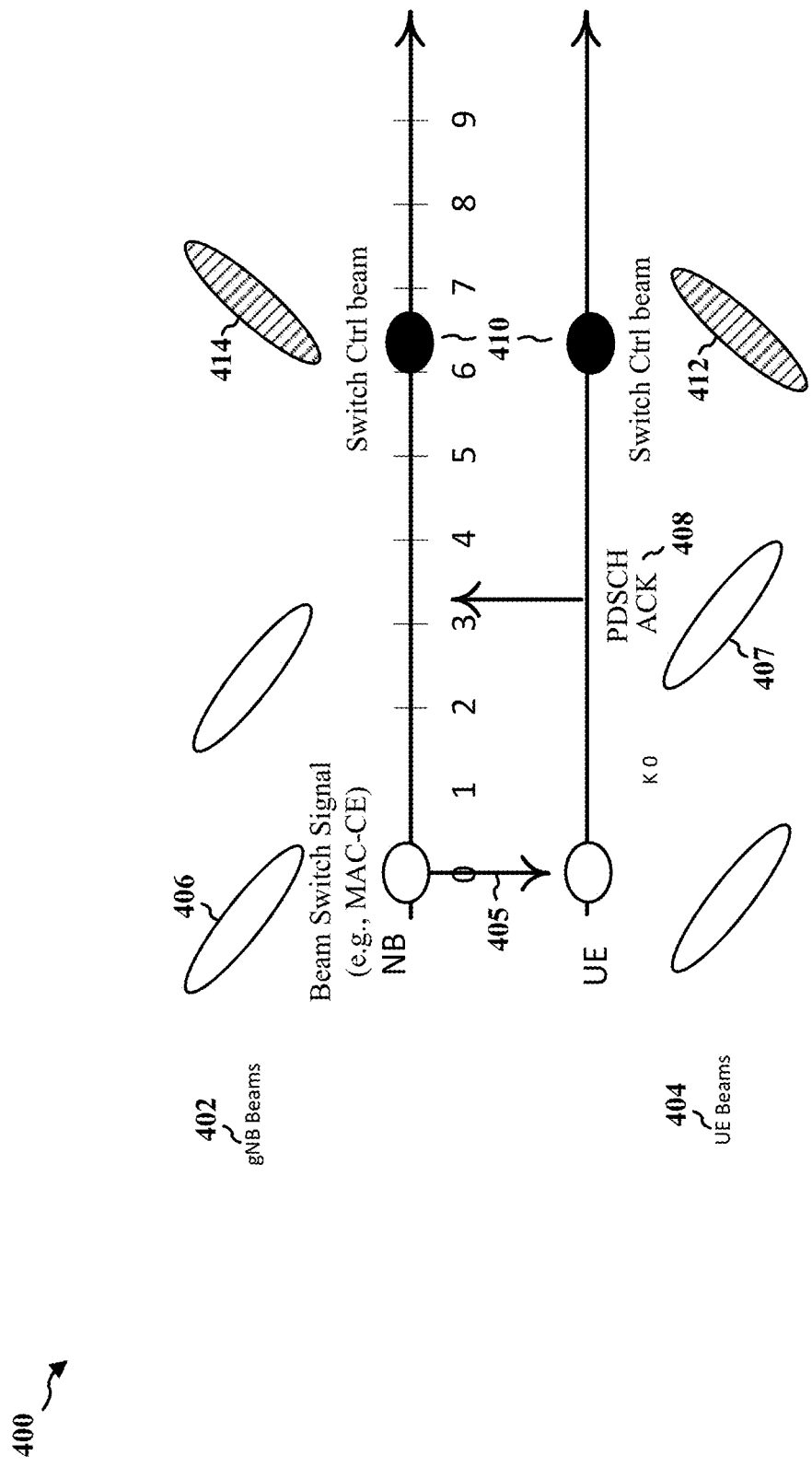
FIG. 4 is a diagram illustrating a beam change procedure in accordance with certain aspects of the disclosure.

FIG. 4 is a diagram 400 illustrating a beam change procedure in accordance with certain aspects of the disclosure. The diagram 400 includes an example of a control beam switch via MAC control element (CE) (MAC-CE) or DCI, where the base station can switch the control beam (e.g., 406) after reception of an ACK (e.g., 408) from the UE. In some instances, a set of possible beams (e.g., candidate beams) in NR may be configured via RRC, and MAC-CE or DCI may configure at least some communication on one of the set of possible beams (e.g., MAC-CE or DCI may indicate a selected beam). For example, an RRC message may indicate a set of possible (or candidate) beams as a set of transmission configuration indicator (TCI) states, with each possible beam corresponding to a respective TCI state. In some further examples, the MAC-CE or DCI may indicate a configured TCI state, which may correspond to a beam the base station is to use. The UE sending the ACK 408 to the base station, provides the base station with the necessary confirmation to switch to a new beam (e.g., 414).

With reference to FIG. 4, the base station 402 may transmit a downlink signal 405 which may include a beam switch signal (e.g., MAC-CE). The downlink signal 405 having the beam switch signal may be transmitted by the base station 402 using a first beam 406. The UE 404 may receive the downlink signal 405 having the beam switch signal. Upon decoding of the downlink signal 405 having the beam switch signal, the UE 404 may transmit the ACK 408 to the base station 402. The ACK 408 is sent on the uplink or PUCCH, but is intended to provide an acknowledgement of the downlink signal 405 received via a downlink channel (e.g., PDSCH). The base station 402, upon receipt of the ACK 408 may switch to a new beam (e.g., 414). The UE 404, may also switch to a new beam (e.g., 412) that corresponds with the new beam (e.g., 414) of the base station 402.

The example of the beam switch procedure of FIG. 4 may not work if the uplink beam of the UE is blocked or does not have sufficient coverage. As such the ACK 408 may not be properly received by the base station 402. The base station must receive the ACK 408 from the UE in order to switch to a new beam, without properly receiving the ACK 408, the UE may believe that the downlink beam at the base station is changing, but since the base station did not properly receive the ACK, the base station will not change its beam. As such, the base station and the UE may experience a misalignment and may not be able to communicate with each other, due to the base station not receiving the ACK.

The present disclosure relates to improving the manner in which a UE transmits an ACK to a base station by utilizing a coverage enhancement to transmit the ACK to the base station in order to acknowledge a beam change instruction. In some aspects, the UE may alter its configuration of transmitting an ACK by utilizing at least one of the coverage enhancements. The coverage enhancements may increase the likelihood of the ACK, sent by the UE to the base station, being received by the base station. For example, the diagrams of FIGS. 12A-D provide examples of coverage enhancements that the UE may utilize for transmitting an ACK to acknowledge a DL signal having a transmit beam change or beam switch signal from the base station. In FIG. 12A, the diagram 1200 discloses a coverage enhancement where the UE may be configured to transmit the ACK in additional time resources within the PUCCH. As shown in the aspect of FIG. 12A, the ACK transmitted with the coverage enhancement (e.g., ACKce) may be transmitted in one or more resource blocks of a subframe (e.g., subframe 3), such that the ACK is transmitted concurrently in time at different frequency resources. Repeated transmission of the ACK may allow for the base station to properly receive the ACK, in comparison to only sending the ACK once. In the diagram 1220 of FIG. 12B, the ACK with the coverage enhancement (e.g., ACKce) may be transmitted by the UE at different times, such that the ACK is transmitted in different subframes. In the diagram 1240 of FIG. 12C, the UE transmits a first ACK, which acknowledges receipt of the DL signal, but not a transmit beam change from the base station. After transmission of the first ACK and decoding of the DL signal, the UE may transmit the ACK with the coverage enhancement to acknowledge the transmit beam change from the base station. In the aspect of FIG. 12C, the UE may utilize the coverage enhancement of transmitting the ACK multiple times and at different frequency resources. In the diagram 1260 of FIG. 12D, the UE may send the ACK with the coverage enhancement, where the coverage enhancement includes a repeated transmission of the ACK at different frequency ranges or time instances. In the aspects of FIG. 12D, the ACK is transmitted twice in subframe 3, and may also be transmitted twice in subframe 9. The aspects provided in FIGS. 12A-12D are examples and are not intended to be an exhaustive list of the coverage enhancements. The disclosure is not intended to be limited to the aspects provided herein.

Figure 5:
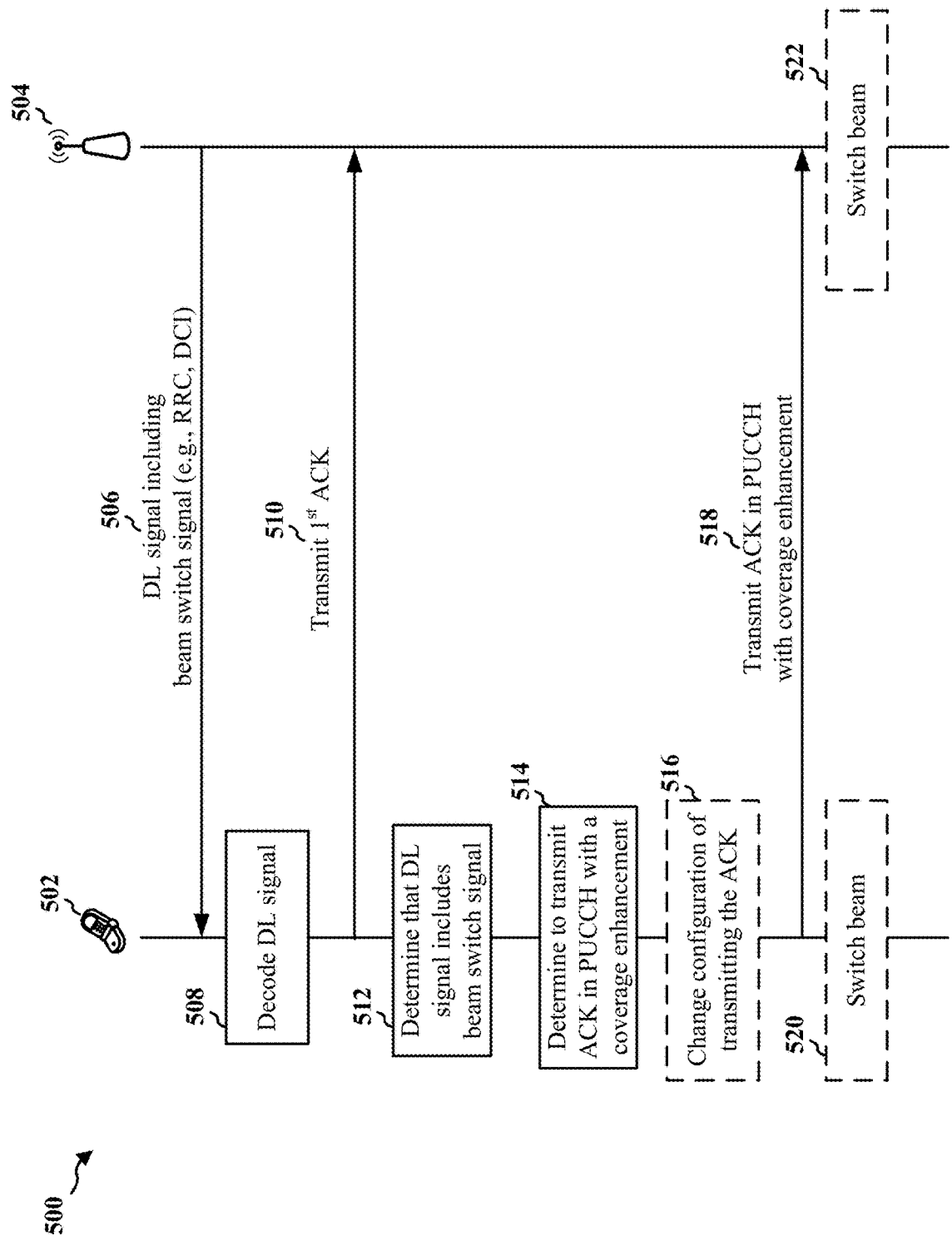
FIG. 5 is a call flow diagram of signaling between a UE and a base station in accordance with certain aspects of the disclosure.

FIG. 5 illustrates an example communication flow 500 between a UE 502 and a base station 504. Optional aspects are illustrated with a dashed line. The base station 504 may provide a cell serving the UE 502. For example, in the context of FIG. 1, the base station 504 may correspond to base station 102/180 and, accordingly, the cell may include a geographic coverage area 110 in which communication coverage is provided and/or small cell 102' having a coverage area 110'. Further, the UE 502 may correspond to at least UE 104. In another example, in the context of FIG. 3, the base station 504 may correspond to the base station 310 and the UE 502 may correspond to the UE 350.

The base station 504 may transmit, to the UE 502, a downlink (DL) signal 506 including a beam switch signal. The beam switch signal may indicate that the base station 504 will change a transmit beam for downlink communication with the UE 502. In some aspects, the base station may transmit a RRC configuration indicating a coverage enhancement (e.g., a RRC message indicating a coverage enhancement). The coverage enhancement indicated in the RRC configuration may indicate to the UE 502 the coverage enhancement to use for transmitting an ACK to acknowledge the reception of the beam switch signal. In some aspects, the base station may generate the beam switch signal to include a configuration indicating to the UE whether to use a coverage enhancement for transmitting the ACK. In some aspects, the base station may generate the beam switch signal to include a configuration indicating the coverage enhancement to use for transmitting the ACK. In some aspects, the base station may transmit through DCI an indication to the UE as to whether to use the coverage enhancement for transmitting the ACK.

The UE 502, upon receipt of the DL signal 506 from the base station 504, may decode, at 508, the DL signal 506 after receipt of the DL signal 506. The UE 502 may check a first cyclic redundancy check (CRC) generated based on the decoded DL signal 506 against a second CRC within the DL signal 506. In instances where the first CRC matches the second CRC, the UE 502 may transmit a first ACK 510 to the base station 504. The first ACK 510 may be transmitted to the base station 504 without a coverage enhancement. The base station 504 may receive the first ACK 510 from the UE which is configured to acknowledge reception of the DL signal 506. The ACK 518 received to acknowledge reception of the transmit beam change is a second ACK that is received by the base station 504 subsequent to the first ACK 510. In some instances, for example, if the first CRC does not match the second CRC, then the UE 502 may not send the first ACK, but may send a negative ACK (NACK). In such aspects, if the base station 504 receives a NACK, the base station 504 may re-transmit the DL signal 506 to the UE 502.

At 512, the UE 502 may be configured to determine that the DL signal 506 includes a beam switch signal indicating that that base station 504 will change a transmit beam for downlink communication with the UE 502. The base station 504 may transmit the beam switch signal in an effort to optimize the beam used for communicating with the UE 502.

At 514, the UE 502 may determine, based on the determination that the DL signal 506 includes the beam switch signal, to transmit an ACK in a PUCCH with a coverage enhancement to acknowledge the transmit beam change by the base station 504, for example, as discussed in FIGS. 12A-12D. In some aspects, the DL signal 506 may be determined as including the beam switch signal after the UE 502 transmits the first ACK 510, and the ACK 518 transmitted in the PUCCH with the coverage enhancement is a second ACK that is transmitted after the first ACK 510. The coverage enhancement may include at least one of transmitting the ACK in additional time or frequency resources within the PUCCH, or repeating the transmission of the ACK at different frequency ranges or time instances within the PUCCH. In some aspects, the coverage enhancement of repeating the transmission of the ACK at different frequency ranges or time instances may comprise transmitting the ACK within each of a plurality of different beams. In some aspects, the beam switch signal may comprise a configuration which indicates whether the UE is to use the coverage enhancement for transmitting the ACK. In some aspects, the beam switch signal may comprise a configuration which indicates the coverage enhancement to be used by the UE to transmit the ACK. The additional time or frequency resources within the PUCCH may comprise a second set of time and frequency resources that have a larger number of resources in comparison to a first set of time and frequency resources for the transmission of a standard ACK. The second set of time and frequency resources may be a superset of the first set of time and frequency resources.

In some aspects, for example at 516, the UE 502 may change a configuration of transmitting the ACK 518. The UE may change the configuration of transmitting the ACK from a first configuration to a second configuration based on the determination that the DL signal includes the beam switch signal. In some aspects, the first configuration may be configured without the coverage enhancement, and the second configuration may be configured to include the coverage enhancement. In some aspects, the UE may receive a RRC configuration that indicates a set of beams for repeating the transmission of the ACK. In such aspects, the plurality of beams may be a subset of the set of beams. In some aspects, the UE may receive a RRC configuration that indicates the coverage enhancement the UE may use for transmitting the ACK. In some aspects, the UE may receive through DCI in a PDCCH an indication whether to use the coverage enhancement for transmitting the ACK.

Upon the determination of the configuration of the coverage enhancement to use for transmitting the ACK, the UE 502 transmits, to the base station 504, the ACK 518 in the PUCCH with the coverage enhancements. The coverage enhancement may increase the likelihood of the ACK 518 being received by the base station 504. As discussed above, the coverage enhancement may send the ACK 518 (e.g., second ACK) more than once based on a repetition configuration. In some aspects, the coverage enhancement may include transmitting the ACK 518 (e.g., second ACK) within a longer symbol duration. The coverage enhancement may utilize more time and/or frequency resources for the transmission of the PUCCH, which may result in using a lower code rate and/or modulation and coding scheme. In some aspects, the coverage enhancement may include repeating the same PUCCH over multiple frequency range and/or time instances and/or beams. In instances of repetition of the PUCCH over multiple beams, the set of beams may be configured by RRC, or may be selected as a pre-specified subset of beams. For example, two beams in a configured set of beams having the lowest indices.

The base station 504 receives the ACK 518 from the UE 502 acknowledging the reception of the transmit beam change by the base station 504. The ACK 518 is received with the coverage enhancement. The coverage enhancement may comprise at least one of receiving the ACK 518 in additional time or frequency resources within the PUCCH, or receiving the ACK 518 a plurality of times at different frequency ranges or time instances within the PUCCH.

After the ACK 518 has been sent to the base station 504 with the coverage enhancement, the UE 502 may switch beams, at 520, in order to communicate on the downlink with the base station 504 through the new transmit beam. The new transmit beam may be based on the received transmit beam change and the transmitted ACK 518.

The base station 504, after receipt of the ACK 518, may also switch beams, at 522, where the base station 504 switches a transmit beam for downlink communication with the UE 502 based on the transmitted transmit beam change and based on the received ACK 518.

Figure 6:
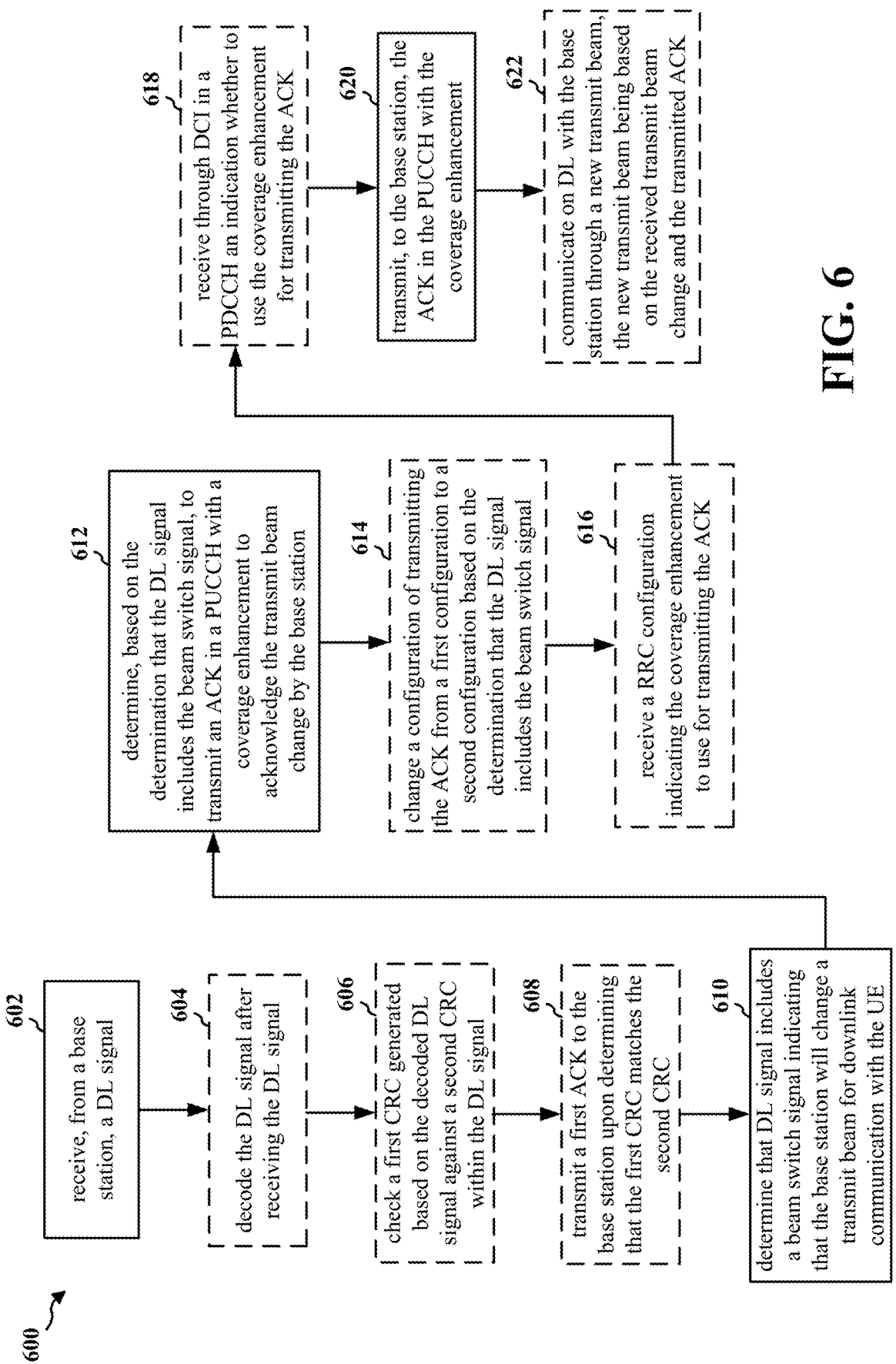
FIG. 6 is a flowchart of a method of wireless communication.

FIG. 6 is a flowchart 600 of a method of wireless communication. The method may be performed by a UE or a component of a UE (e.g., the UE 104, 350, 502, 1050; the apparatus 702/702'; the processing system 814, which may include the memory 360 and which may be the entire UE 350 or a component of the UE 350, such as the TX processor 368, the RX processor 356, and/or the controller/processor 359). According to various aspects, one or more of the illustrated operations of method 600 may be omitted, transposed, and/or contemporaneously performed. Optional aspects are illustrated with a dashed line. The method may enable a UE to utilize a coverage enhancement to transmit an ACK to a base station to acknowledge a beam change instruction.

At 602, the UE may receive a DL signal. In some aspects, the UE may receive, from a base station, information indicating a beam switch from a first beam via which the UE communicates with the base station to a second beam. For example, the DL signal may include the information indicating a beam switch from a first beam via which the UE communicates with the base station to a second beam. For example, 602 may be performed by reception component 704 of apparatus 702. The UE may receive the DL signal from a base station.

In some aspects, for example at 604, the UE may decode the DL signal after receiving the DL signal. That is, the UE may determine that the received DL signal includes the information indicating a beam switch from a first beam via which the UE communicates with the base station to a second beam. For example, first, the UE may process the DL signal, such as by converting the DL signal from analog to digital; second, the UE may identify information in the DL signal corresponding to a beam index (e.g., TCI state(s)) of a beam, which may be different from another beam via which the UE currently (or most recently) communicates with the base station. For example, 604 may be performed by decode component 706 of apparatus 702.

In some aspects, for example at 606, the UE may check a first cyclic redundancy check (CRC) generated based on the decoded DL signal. For example, 606 may be performed by CRC component 708 of apparatus 702. The UE may check the first CRC generated based on the decoded DL signal against a second CRC with the DL signal.

In some aspects, for example at 608, the UE may transmit a first ACK to the base station. For example, 608 may be performed by 1$^{st}$ ACK component 710 of apparatus 702. The UE may transmit the first ACK to the base station upon the determination that the first CRC matches the second CRC. In some aspects, the first ACK may be transmitted by the UE to the base station without a coverage enhancement.

At 610, the UE may determine that the DL signal includes a beam switch signal. For example, 610 may be performed by beam switch component 712 of apparatus 702. The beam switch signal may indicate that the base station may change a transmit beam for downlink communication with the UE. The base station may transmit the beam switch signal in an effort to optimize the beam used for communicating with the UE.

At 612, the UE may determine to transmit an ACK in a PUCCH with a coverage enhancement to acknowledge the transmit beam change by the base station. For example, 612 may be performed by coverage enhancement component 714 of apparatus 702. The UE may determine to transmit the ACK in the PUCCH with the coverage enhancement, based on the determination that the DL signal includes the beam switch signal. In some aspects, the UE may determine that the DL signal includes the beam switch signal after the UE transmits the first ACK, and that the ACK transmitted in the PUCCH with the coverage enhancement is a second ACK that is transmitted after the first ACK. The coverage enhancement may include at least one of transmitting the ACK in additional time or frequency resources within the PUCCH, or repeating the transmission of the ACK at different frequency ranges or time instances within the PUCCH. In some aspects, the coverage enhancement of repeating the transmission of the ACK at different frequency ranges or time instances may comprise transmitting the ACK within each of a plurality of different beams. In some aspects, the beam switch signal may comprise a configuration which indicates whether the UE is to use the coverage enhancement for transmitting the ACK. In some aspects, the beam switch signal may comprise a configuration which indicates the coverage enhancement to be used by the UE to transmit the ACK. The additional time or frequency resources within the PUCCH may comprise a second set of time and frequency resources that have a larger number of resources in comparison to a first set of time and frequency resources for the transmission of a standard ACK (e.g., first ACK 510). The second set of time and frequency resources may be a superset of the first set of time and frequency resources.

In some aspects, for example at 614, the UE may change a configuration of transmitting the ACK. For example, 614 may be performed by configuration component 716 of apparatus 702. The UE may change the configuration of transmitting the ACK from a first configuration to a second configuration based on the determination that the DL signal includes the beam switch signal. In some aspects, the first configuration may be configured without the coverage enhancement, and the second configuration may be configured to include the coverage enhancement. In some aspects, the UE may receive a RRC configuration that indicates a set of beams for repeating the transmission of the ACK. In such aspects, the plurality of beams may be a subset of the set of beams.

In some aspects, for example at 616, the UE may receive a RRC configuration that indicates the coverage enhancement the UE may use for transmitting the ACK. For example, 616 may be performed by RRC component 718 of apparatus 702. Some or all of the parameters for the coverage enhancement may be configured by the RRC configuration received by the UE. For example, a set of repetition options for transmitting the ACK may be defined within the RRC configuration.

In some aspects, for example at 618, the UE may receive through DCI an indication whether to use the coverage enhancement for transmitting the ACK. For example, 618 may be performed by DCI component 720 of apparatus 702. The UE may receive the DCI in a PDCCH.

At 620, the UE may transmit the ACK in the PUCCH with the coverage enhancement. In some aspects, the UE may transmit, based on the information indicating the beam switch (see, e.g., 602), two or more ACK messages to the base station on a control channel (e.g., PUCCH), and the two or more ACK messages may acknowledge receipt of the information indicating the beam switch from the base station. For example, 620 may be performed by 2nd ACK component 722 of apparatus 702. The UE may transmit the ACK in the PUCCH with the coverage enhancement to the base station. The coverage enhancement may increase the likelihood of the ACK being received by the base station. As discussed above, the coverage enhancement may send the ACK (e.g., second ACK) more than once based on a repetition configuration. In some aspects, the coverage enhancement may include transmitting the ACK (e.g., second ACK) within a longer symbol duration. The coverage enhancement may utilize more time and/or frequency resources for the transmission of the PUCCH, which may result in using a lower code rate and/or modulation and coding scheme. In some aspects, the coverage enhancement may include repeating the same PUCCH over multiple frequency range and/or time instances and/or beams. In instances of repetition of the PUCCH over multiple beams, the set of beams may be configured by RRC, or may be selected as a pre-specified subset of beams. For example, two beams in a configured set of beams having the lowest indices.

In some aspects, for example at 622, the UE may communicate on the DL with the base station through a new transmit beam. For example, 622 may be performed by new beam component 724 of apparatus 702. The new transmit beam may be based on the received transmit beam change and the transmitted ACK (e.g., second ACK).

In some aspects, the UE may receive, from the base station, information indicating a beam switch from a first beam via which the UE communicates with the base station to a second beam. In some aspects, the UE may transmit based on the information indicating the beam switch, two or more ACK messages to the base station on a control channel, the two or more ACK messages acknowledging receipt of the information indicating the beam switch from the base station. In some aspects, the control channel is at least one of a physical uplink control channel (PUCCH) or an enhanced physical uplink control channel (ePUCCH).

In some aspects, transmission of the two or more ACK messages to the base station on the control channel by the UE may include transmitting at least two ACK messages of the two or more ACK messages in two or more resource blocks of a subframe by the UE. In some aspects, transmission of the two or more ACK messages to the base station on the control channel by the UE may include transmitting at least two ACK messages of the two or more ACK messages in two or more subframes by the UE.

In some aspects, transmission of the two or more ACK messages to the base station on the control channel by the UE may include transmitting at least one ACK message of the two or more ACK messages at a first frequency of a first subframe by the UE, and transmitting at least another ACK message of the two or more ACK messages at a second frequency of a second subframe by the UE.

In some aspects, transmission of the two or more ACK messages to the base station on the control channel by the UE may include transmitting a first set of at least two ACK messages of the two or more ACK messages at different frequencies of a first subframe by the UE, and transmitting a second set of at least two ACK messages of the two or more ACK messages at different frequencies of a second subframe by the UE.

In some aspects, transmission of the two or more ACK messages to the base station on the control channel by the UE may include transmitting at least one ACK message of the two or more ACK messages within each of a plurality of beams by the UE. In some aspects, the UE may receive, from the base station, an RRC message indicating a set of beams for transmitting the two or more ACK messages to the base station, wherein the plurality of beams are a subset of the set of beams.

In some aspects, the UE may change, based on the received information from the base station, a configuration for transmitting an ACK message from a first configuration to a second configuration, where the second configuration indicates transmitting the two or more ACK messages.

Figure 7:
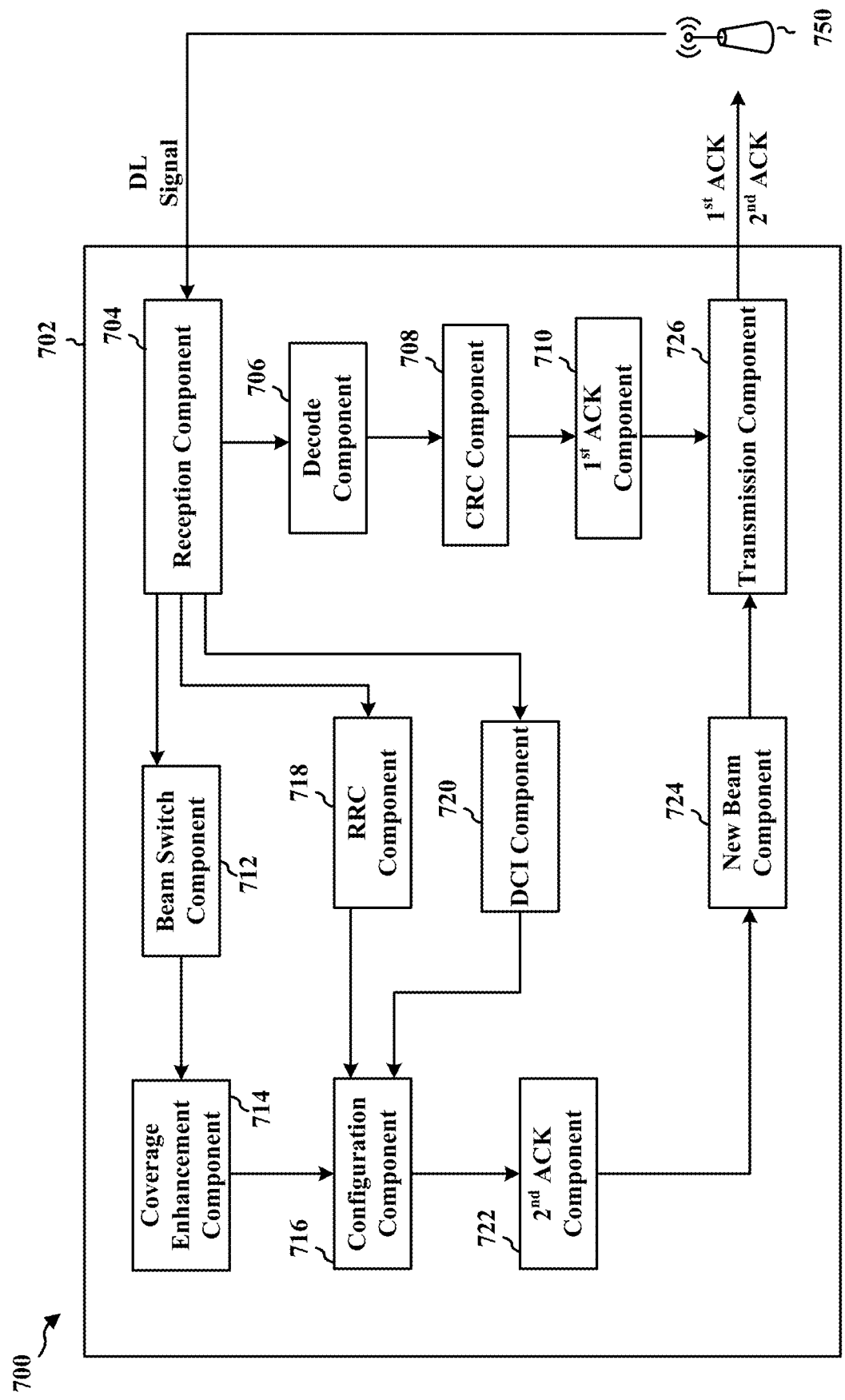
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a UE or a component of a UE. The apparatus includes a reception component 704 that may be configured to receive various types of signals/messages and/or other information from other devices, including, for example, the base station 750. The reception component 704 may receive, from a base station, a DL signal, e.g., as described in connection with 602 of FIG. 6. The apparatus includes a decode component 706 that may decode the DL signal after receiving the DL signal, e.g., as described in connection with 604 of FIG. 6. The apparatus includes a CRC component 708 that may check a first CRC generated based on the decoded DL signal, e.g., as described in connection with 606 of FIG. 6. The apparatus includes a $1^{st}$ ACK component 710 that may transmit a first ACK to the base station upon determining that the first CRC matches a second CRC, e.g., as described in connection with 608 of FIG. 6. The apparatus includes a beam switch component 712 that may determine that the DL signal includes a beam switch signal indicating that the base station will change a transmit beam for downlink communication with the UE, e.g., as described in connection with 610 of FIG. 6. The apparatus includes a coverage enhancement component 714 that may determine to transmit an ACK in a PUCCH with a coverage enhancement to acknowledge the transmit beam change by the base station, e.g., as described in connection with 612 of FIG. 6. The apparatus includes a configuration component 716 that may change a configuration of transmitting the ACK from a first configuration to a second configuration based on the determination that the DL signal includes the beam switch signal, e.g., as described in connection with 614 of FIG. 6. The apparatus includes an RRC component 718 that may receive a RRC configuration indicating the coverage enhancement to use for transmitting the ACK, e.g., as described in connection with 616 of FIG. 6. The apparatus includes a DCI component 720 that may receive through DCI in a PDCCH an indication whether to use the coverage enhancement for transmitting the ACK, e.g., as described in connection with 618 of FIG. 6. The apparatus includes a $2^{nd}$ ACK component 722 that may transmit, to the base station, the ACK in the PUCCH with the coverage enhancement, e.g., as described in connection with 620 of FIG. 6. The apparatus includes a new beam component 724 that may communicate on DL with the base station through a new transmit beam, e.g., as described in connection with 622 of FIG. 6. The apparatus includes a transmission component 726 that may be configured to transmit various types of signals/messages and/or other information to other devices, including, for example, the base station 750.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
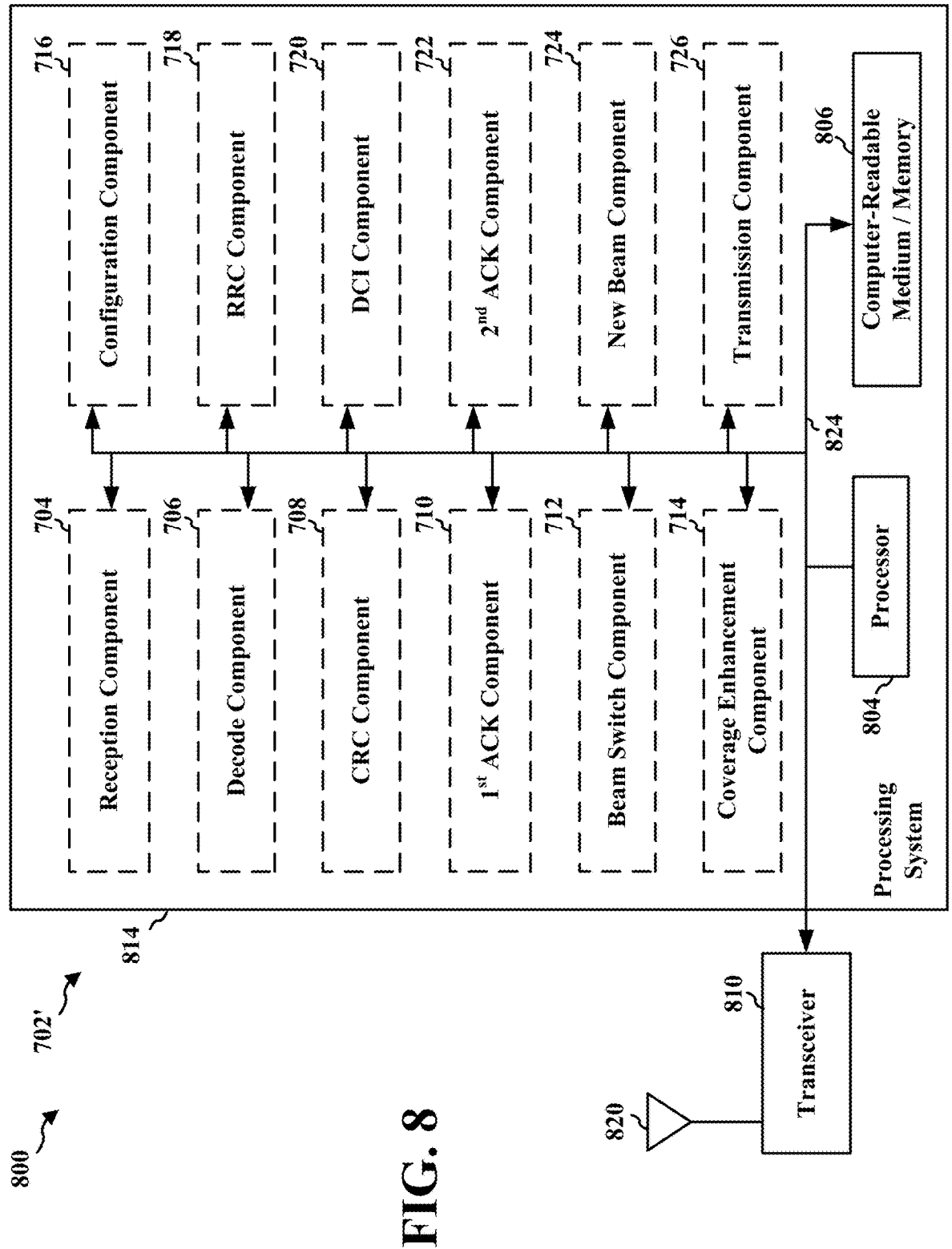
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720, 722, 724, 726, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 726, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720, 722, 724, 726. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for receiving, from a base station, a DL signal. The apparatus includes means for determining that the DL signal includes a beam switch signal indicating that the base station will change a transmit beam for downlink communication with the UE. The apparatus includes means for determining, based on the determination that the DL signal includes the beam switch signal, to transmit an ACK in a PUCCH with a coverage enhancement to acknowledge the transmit beam change by the base station. The coverage enhancement comprising at least one of transmitting the ACK in additional time or frequency resources within the PUCCH, or repeating a transmission of the ACK at different frequency ranges or time instances within the PUCCH. The apparatus includes means for transmitting, to the base station, the ACK in the PUCCH with the coverage enhancement. The apparatus further includes means for decoding the DL signal after receiving the DL signal. The apparatus further includes means for checking a first CRC generated based on the decoded DL signal against a second CRC within the DL signal. The apparatus further includes means for transmitting a first ACK to the base station upon determining that the first CRC matches the second CRC. The apparatus further includes means for determining that the DL signal includes the beam switch signal after transmitting the first ACK. The ACK transmitted with the coverage enhancement is a second ACK transmitted after the first ACK> The apparatus further includes means for changing a configuration of transmitting the ACK from a first configuration to a second configuration based on the determination that the DL signal includes the beam switch signal. The first configuration being without coverage enhancement and the second configuration being with coverage enhancement. The apparatus further includes means for receiving a RRC configuration indicating a set of beams for repeating the transmission of the ACK. The plurality of beams being a subset of the set of beams. The apparatus further includes means for receiving a RRC configuration indicating the coverage enhancement to use for transmitting the ACK. The apparatus further includes means for receiving through DCI in a PDCCH an indication whether to use the coverage enhancement for transmitting the ACK. The apparatus further includes means for communicating on DL with the base station through a new transmit beam, the new transmit beam being based on the received transmit beam change and the transmitted ACK. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
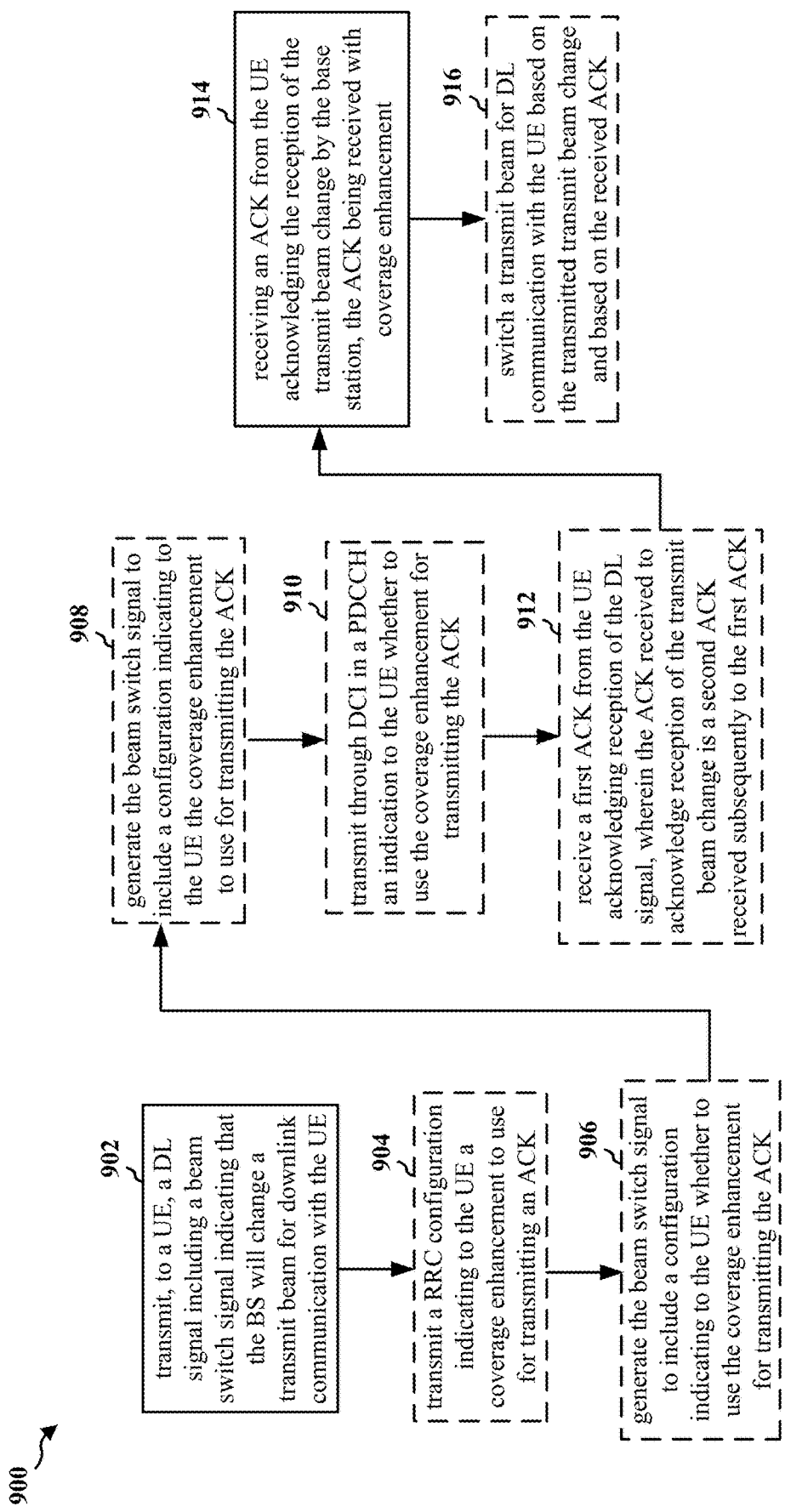
FIG. 9 is a flowchart of a method of wireless communication.

FIG. 9 is a flowchart 900 of a method of wireless communication. The method may be performed by a base station or a component of a base station (e.g., the base station 102, 180, 310, 504, 750; the apparatus 1002/1002'; the processing system 1114, which may include the memory 376 and which may be the entire base station 310 or a component of the base station 310, such as the TX processor 316, the RX processor 370, and/or the controller/processor 375). According to various aspects, one or more of the illustrated operations of the method 900 may be omitted, transposed, and/or contemporaneously performed. The method may allow a base station to receive an ACK from a UE acknowledging reception of a beam switch signal, where the ACK is received with a coverage enhancement.

At 902, the base station may transmit a DL signal including a beam switch signal. In some aspects, the base station may transmit, to a UE, information indicating a beam switch from a first beam via which the UE communicates with the base station to a second beam. For example, 902 may be performed by beam switch component 1006 of apparatus 1002. The base station may transmit the DL signal including the beam switch signal to a UE. The beam switch signal may indicate that the base station may change a transmit beam for downlink communication with the UE.

In some aspects, for example at 904, the base station may transmit a RRC configuration indicating a coverage enhancement. For example, 904 may be performed by RRC component 1008 of apparatus 1002. The coverage enhancement indicated in the RRC configuration may indicate to the UE the coverage enhancement to use for transmitting an ACK. The ACK acknowledging the reception of the beam switch signal.

In some aspects, for example at 906, the base station may generate the beam switch signal to include a configuration indicating whether to use a coverage enhancement. For example, 906 may be performed by configuration component 1010 of apparatus 1002. The generated beam switch signal including the configuration may indicate to the UE whether to use the coverage enhancement to use for transmitting the ACK.

In some aspects, for example at 908, the base station may generate the beam switch signal to include a configuration indicating the coverage enhancement. For example, 908 may be performed by coverage enhancement component 1012 of apparatus 1002. The generated beam switch signal including the configuration may indicate to the UE the coverage enhancement to use for transmitting the ACK.

In some aspects, for example at 910, the base station may transmit through DCI an indication to the UE whether to use the coverage enhancement. For example, 910 may be performed by DCI component 1014 of apparatus 1002. The base station may transmit the indication through DCI in a PDCCH. The indication may indicate to the UE whether to use the coverage enhancement for transmitting the ACK.

In some aspects, for example at 912, the base station may receive a first ACK from the UE acknowledging reception of the DL signal. In some aspects, the base station may receive, in response to the transmitted information indicating the beam switch (see, e.g., 902), at least one ACK message on a control channel (e.g., PUCCH) from the UE, and the at least one ACK message may acknowledge receipt of the information indicating the beam switch from the base station. For example, 912 may be performed by $1^{st}$ ACK component 1016 of apparatus 1002. The ACK received to acknowledge reception of the transmit beam change may be a second ACK received after the first ACK. In some aspects, the base station receives first ACK without the coverage enhancement.

At 914, the base station may receive an ACK from the UE acknowledging the reception of the transmit beam change by the base station. In some aspects, the base station may receive, in response to the transmitted information indicating the beam switch (see, e.g., 902), at least one additional ACK message on the control channel from the UE, and the at least one additional ACK message may acknowledge receipt of the information indicating the beam switch from the base station. For example, 914 may be performed by $2^{nd}$ ACK component 1018 of apparatus 1002. The ACK may be received with the coverage enhancement. In some aspects, the coverage enhancement may comprise at least one of receiving the ACK in additional time or frequency resources within the PUCCH, or receiving the ACK a plurality of times at different frequency ranges or time instances within the PUCCH. In some aspects, the coverage enhancement of receiving the ACK a plurality of times at different frequency ranges or time instances may comprise receiving the ACK within each of a plurality of different beams. In some aspects, the base station may transmit a RRC configuration to the UE, indicating a set of beams for the UE to repeat the transmission of the ACK. The plurality of beams may be a subset of beams indicted by the RRC configuration. In some aspects, the additional time or frequency resources within the PUCCH may comprise a second set of time and frequency resources with a larger number of resources than a first set of time and frequency resources for transmission of a standard ACK. The second set of time and frequency resources may be a superset of the first set of time and frequency resources.

In some aspects, for example at 916, the base station may switch a transmit beam for DL communication with the UE. For example, 916 may be performed by new beam component 1020 of apparatus 1002. The base station may switch the transmit beam for DL communication with the UE based on the transmitted transmit beam change and based on the received ACK.

In some aspects, the base station may transmit, to a UE, information indicating a beam switch from a first beam via which the UE communicates with the base station to a second beam. In some aspects, the base station may receive, in response to the transmitted information indicating the beam switch, two or more ACK messages on a control channel from the UE, the two or more ACK messages acknowledging receipt of the information indicating the beam switch from the base station.

In some aspects, reception of the two or more ACK messages on the control channel from the UE by the base station may include receiving at least two ACK messages of the two or more ACK messages in two or more resource blocks of a subframe by the base station. In some aspects, reception of the two or more ACK messages on the control channel from the UE by the base station may include receiving at least two ACK messages of the two or more ACK messages in two or more subframes by the base station.

In some aspects, reception of the two or more ACK messages on the control channel from the UE by the base station may include receiving at least one ACK message of the two or more ACK messages at a first frequency of a first subframe by the base station, and receiving at least another ACK message of the two or more ACK messages at a second frequency of a second subframe by the base station.

In some aspects, reception of the two or more ACK messages on the control channel from the UE by the base station may include receiving a first set of at least two ACK messages of the two or more ACK messages at different frequencies of a first subframe by the base station, and receiving a second set of at least two ACK messages of the two or more ACK messages at different frequencies of a second subframe by the base station.

In some aspects, reception of the two or more ACK messages on the control channel from the UE by the base station may include receiving at least one ACK message of the two or more ACK messages within each of a plurality of beams by the base station. In some aspects, the base station may transmit, to the UE, an RRC message indicating a set of beams for receiving the two or more ACK messages from the UE, wherein the plurality of beams are a subset of the set of beams.

Figure 10:
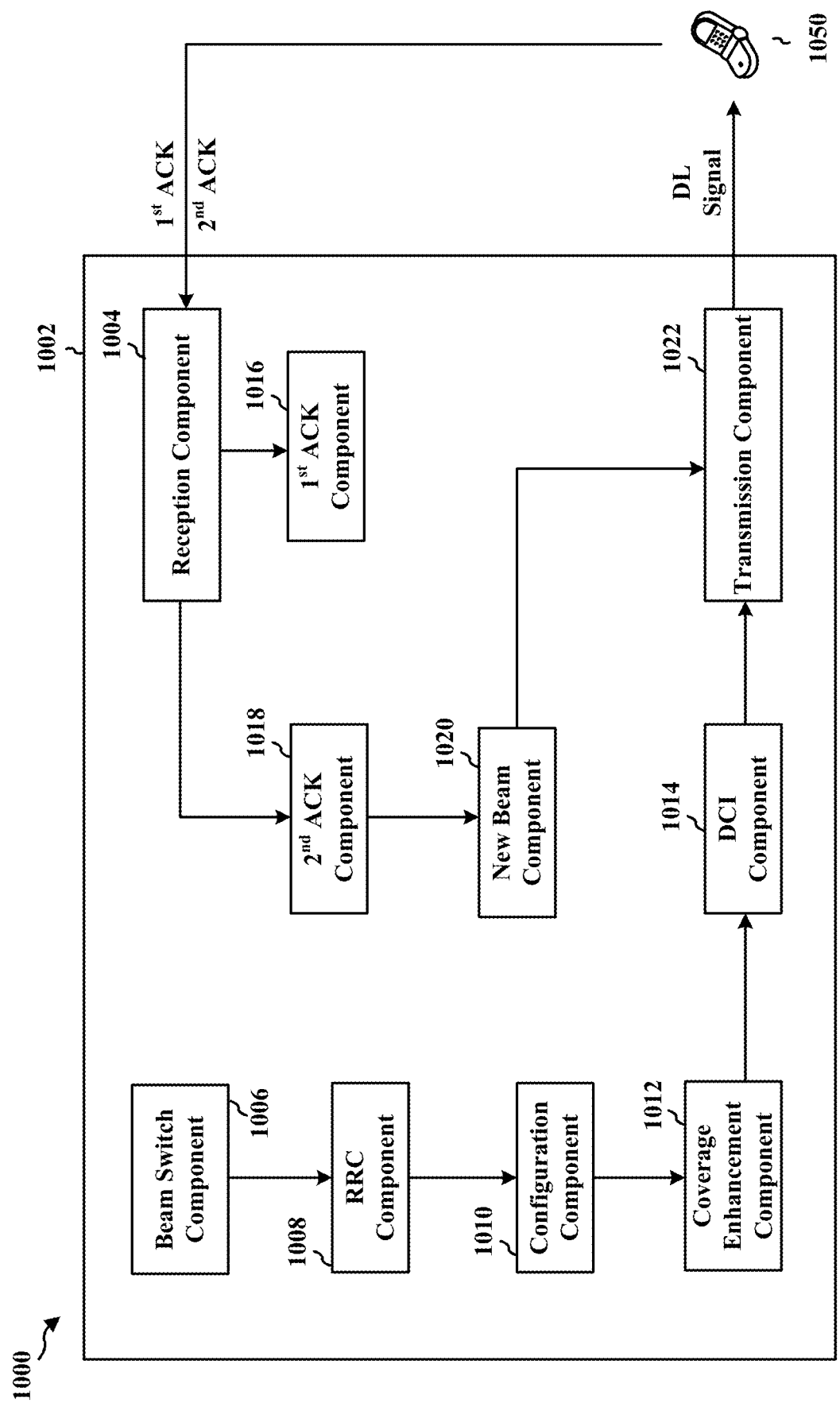
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a base station or a component of a base station. The apparatus includes a reception component 1004 that may be configured to receive various types of signals/messages and/or other information from other devices, including, for example, the UE 1050. The apparatus includes a beam switch component 1006 that may transmit, to a UE, a DL signal including a beam switch signal indicating that the base station will change a transmit beam for downlink communication with the UE, e.g., as described in connection with 902 of FIG. 9. The apparatus includes an RRC component 1008 that transmits a RRC configuration indicating to the UE the coverage enhancement to use for transmitting the ACK, e.g., as described in connection with 904 of FIG. 9. The apparatus includes a configuration component 1010 that generates the beam switch signal to include a configuration indicating whether to use the coverage enhancement for transmitting the ACK, e.g., as described in connection with 906 of FIG. 9. The apparatus includes a coverage enhancement component 1012 that generates the beam switch signal to include a configuration indicating the coverage enhancement to use for transmitting the ACK, e.g., as described in connection with 908 of FIG. 9. The apparatus includes a DCI component 1014 that transmits through DCI in a PDCCH an indication to the UE whether to use the coverage enhancement for transmitting the ACK, e.g., as described in connection with 910 of FIG. 9. The apparatus includes a $1^{st}$ ACK component 1016 receives a first ACK from the UE acknowledging reception of the DL signal, e.g., as described in connection with 912 of FIG. 9. The apparatus includes a $2^{nd}$ ACK component 1018 that may receive an ACK from the UE acknowledging the reception of the transmit beam change by the base station, e.g., as described in connection with 914 of FIG. 9. The apparatus includes a new beam component 1020 that may switch a transmit beam for DL communication with the UE, e.g., as described in connection with 916 of FIG. 9. The apparatus includes a transmission component 1022 that may be configured to transmit various types of signals/messages and/or other information to other devices, including, for example, the UE 1050.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
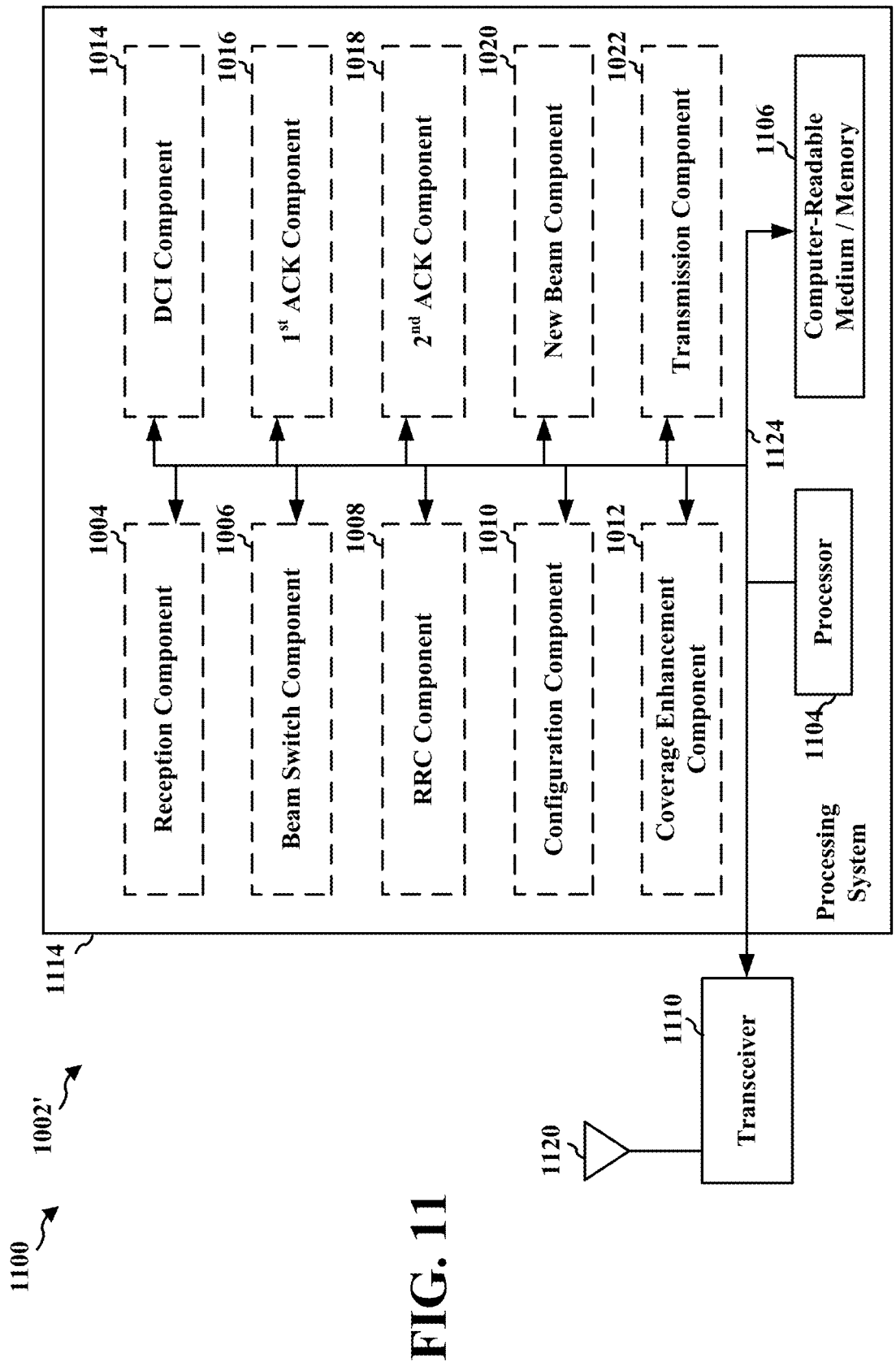
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, 1020, 1022, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1022, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018, 1020, 1022. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for transmitting, to a UE, a DL signal including a beam switch signal indicating that the BS will change a transmit beam for downlink communication with the UE. The apparatus includes means for receiving an ACK from the UE acknowledging the reception of the transmit beam change by the base station. The ACK being received with coverage enhancement. The coverage enhancement comprising at least one of receiving the ACK in additional time or frequency resources within the PUCCH, or receiving the ACK a plurality of times at different frequency ranges or time instances within the PUCCH. The apparatus further includes means for receiving a first ACK from the UE acknowledging reception of the DL signal. The ACK received to acknowledge reception of the transmit beam change is a second ACK received subsequently to the first ACK. The apparatus further includes means for transmitting a RRC configuration indicating a set of beams for the UE repeating the transmission of the ACK. The plurality of beams being a subset of beams indicated by the RRC configuration. The apparatus further includes means for transmitting a RRC configuration indicating to the UE the coverage enhancement to use for transmitting the ACK. The apparatus further includes means for generating the beam switch signal to include a configuration indicating to the UE whether to use the coverage enhancement for transmitting the ACK. The apparatus further includes means for generating the beam switch signal to include a configuration indicating to the UE the coverage enhancement to use for transmitting the ACK. The apparatus further includes means for transmitting through DCI in a PDCCH an indication to the UE whether to use the coverage enhancement for transmitting the ACK. The apparatus further includes means for switching a transmit beam for DL communication with the UE based on the transmitted transmit beam change and based on the received ACK. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The present disclosure relates to improving the manner in which a UE transmits an ACK to a base station by utilizing a coverage enhancement to transmit the ACK to the base station in order to acknowledge a beam change instruction. In some aspects, the UE may alter its configuration of transmitting an ACK by utilizing at least one of the coverage enhancements. At least one advantage of the disclosure is that the coverage enhancements may increase the likelihood of the ACK, sent by the UE to the base station, being received by the base station. For example, the coverage enhancements may include at least one of transmitting the ACK in additional time or frequency resources within a PUCCH, or repeating a transmission of the ACK at different frequency ranges or time instances within the PUCCH.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
   receiving, from a base station, information indicating a beam switch from a first beam via which the UE communicates with the base station to a second beam; and
   transmitting, based on the information indicating the beam switch, two or more acknowledgement (ACK) messages with different coverage enhancement configurations to the base station on a control channel, the two or more ACK messages acknowledging receipt of the information indicating the beam switch from the base station.

2. The method of claim 1, wherein the transmitting the two or more ACK messages to the base station on the control channel comprises transmitting at least two ACK messages of the two or more ACK messages in two or more resource blocks of a subframe.

3. The method of claim 1, wherein the transmitting the two or more ACK messages to the base station on the control channel comprises transmitting at least two ACK messages of the two or more ACK messages in two or more subframes.

4. The method of claim 1, wherein the transmitting the two or more ACK messages to the base station on the control channel comprises:
   transmitting at least one ACK message of the two or more ACK messages at a first frequency of a first subframe; and
   transmitting at least another ACK message of the two or more ACK messages at a second frequency of a second subframe.

5. The method of claim 1, wherein the transmitting the two or more ACK messages to the base station on the control channel comprises:
   transmitting a first set of at least two ACK messages of the two or more ACK messages at different frequencies of a first subframe; and
   transmitting a second set of at least two ACK messages of the two or more ACK messages at different frequencies of a second subframe.

6. The method of claim 1, wherein the transmitting the two or more ACK messages to the base station on the control channel comprises transmitting at least one ACK message of the two or more ACK messages within each of a plurality of beams.

7. The method of claim 6, further comprising:
   receiving, from the base station, a radio resource control (RRC) message indicating a set of beams for transmitting the two or more ACK messages to the base station, wherein the plurality of beams are a subset of the set of beams.

8. The method of claim 1, further comprising:
   changing, based on the received information, a configuration for transmitting an ACK message from a first configuration to a second configuration, wherein the second configuration indicates transmitting the two or more ACK messages.

9. The method of claim 1, wherein the control channel is at least one of a physical uplink control channel (PUCCH).

10. An apparatus for wireless communication by a user equipment (UE), comprising:
    a memory; and
    at least one processor coupled to the memory and configured to:
       receive, from a base station, information indicating a beam switch from a first beam via which the UE communicates with the base station to a second beam; and
       transmit, based on the information indicating the beam switch, two or more acknowledgement (ACK) messages with different coverage enhancement configurations to the base station on a control channel, the two or more ACK messages acknowledging receipt of the information indicating the beam switch from the base station.

11. The apparatus of claim 10, wherein to transmit the two or more ACK messages to the base station on the control channel, the at least one processor is further configured to transmit at least two ACK messages of the two or more ACK messages in two or more resource blocks of a subframe.

12. The apparatus of claim 10, wherein to transmit the two or more ACK messages to the base station on the control channel, the at least one processor is further configured to transmit at least two ACK messages of the two or more ACK messages in two or more subframes.

13. The apparatus of claim 10, wherein to transmit the two or more ACK messages to the base station on the control channel, the at least one processor is further configured to:
    transmit at least one ACK message of the two or more ACK messages at a first frequency of a first subframe; and
    transmit at least another ACK message of the two or more ACK messages at a second frequency of a second subframe.

14. The apparatus of claim 10, wherein to transmit the two or more ACK messages to the base station on the control channel, the at least one processor is further configured to:
    transmit a first set of at least two ACK messages of the two or more ACK messages at different frequencies of a first subframe; and
    transmit a second set of at least two ACK messages of the two or more ACK messages at different frequencies of a second subframe.

15. The apparatus of claim 10, wherein to transmit the two or more ACK messages to the base station on the control channel, the at least one processor is further configured to transmit at least one ACK message of the two or more ACK messages within each of a plurality of beams.

16. The apparatus of claim 15, wherein the at least one processor is further configured to:
receive, from the base station, a radio resource control (RRC) message indicating a set of beams for transmitting the two or more ACK messages to the base station, wherein the plurality of beams are a subset of the set of beams.

17. The apparatus of claim 10, wherein the at least one processor is further configured to:
change, based on the received information, a configuration for transmitting an ACK message from a first configuration to a second configuration, wherein the second configuration indicates transmitting the two or more ACK messages.

18. The apparatus of claim 10, wherein the control channel is at least one of a physical uplink control channel (PUCCH).

19. A method of wireless communication by a base station, comprising:
transmitting, to a user equipment (UE), information indicating a beam switch from a first beam via which the UE communicates with the base station to a second beam; and
receiving, in response to the transmitted information indicating the beam switch, two or more acknowledgement (ACK) messages with different coverage enhancement configurations on a control channel from the UE, the two or more ACK messages acknowledging receipt of the information indicating the beam switch from the base station.

20. The method of claim 19, wherein receiving the two or more ACK messages on the control channel from the UE further comprises receiving at least two ACK messages of the two or more ACK messages in two or more resource blocks of a subframe.

21. The method of claim 19, wherein receiving the two or more ACK messages on the control channel from the UE further comprises receiving at least two ACK messages of the two or more ACK messages in two or more subframes.

22. The method of claim 19, wherein receiving the two or more ACK messages on the control channel from the UE further comprises:
receiving at least one ACK message of the two or more ACK messages at a first frequency of a first subframe; and
receiving at least another ACK message of the two or more ACK messages at a second frequency of a second subframe.

23. The method of claim 19, wherein receiving the two or more ACK messages on the control channel from the UE further comprises:
receiving a first set of at least two ACK messages of the two or more ACK messages at different frequencies of a first subframe; and
receiving a second set of at least two ACK messages of the two or more ACK messages at different frequencies of a second subframe.

24. The method of claim 19, wherein receiving the two or more ACK messages on the control channel from the UE further comprises receiving at least one ACK message of the two or more ACK messages within each of a plurality of beams.

25. The method of claim 24, further comprising:
transmitting, to the UE, a radio resource control (RRC) message indicating a set of beams for receiving the two or more ACK messages from the UE, wherein the plurality of beams are a subset of the set of beams.

26. An apparatus for wireless communication by a base station, comprising:
a memory; and
at least one processor coupled to the memory and configured to:
transmit, to a user equipment (UE), information indicating a beam switch from a first beam via which the UE communicates with the base station to a second beam; and
receive, in response to the transmitted information indicating the beam switch, two or more acknowledgement (ACK) messages with different coverage enhancement configurations on a control channel from the UE, the two or more ACK messages acknowledging receipt of the information indicating the beam switch from the base station.

27. The apparatus of claim 26, wherein to receive the two or more ACK messages on the control channel from the UE, the at least one processor is further configured to receive at least two ACK messages of the two or more ACK messages in two or more resource blocks of a subframe.

28. The apparatus of claim 26, wherein to receive the two or more ACK messages on the control channel from the UE, the at least one processor is further configured to receive at least two ACK messages of the two or more ACK messages in two or more subframes.

29. The apparatus of claim 26, wherein to receive the two or more ACK messages on the control channel from the UE, the at least one processor is configured to:
receive at least one ACK message of the two or more ACK messages at a first frequency of a first subframe; and
receive at least another ACK message of the two or more ACK messages at a second frequency of a second subframe.

30. The apparatus of claim 26, wherein to receive the two or more ACK messages on the control channel from the UE, the at least one processor is configured to:
receive a first set of at least two ACK messages of the two or more ACK messages at different frequencies of a first subframe; and
receive a second set of at least two ACK messages of the two or more ACK messages at different frequencies of a second subframe.

* * * * *